US006360867B1

(12) United States Patent
Ford

(10) Patent No.: US 6,360,867 B1
(45) Date of Patent: Mar. 26, 2002

(54) BELT CARRIER FOR DISPENSING MACHINES

(75) Inventor: Allan L. Ford, Melrose Park, PA (US)

(73) Assignee: Reborn Products, Co., Inc., Bensalem, PA (US)

( * ) Notice: Subject to any disclaimer, the term of this patent is extended or adjusted under 35 U.S.C. 154(b) by 0 days.

(21) Appl. No.: 09/592,823

(22) Filed: Jun. 13, 2000

(51) Int. Cl.[7] .............................................. B65G 47/48
(52) U.S. Cl. ............. 198/349; 198/867.11; 198/803.14; 209/937; 206/459.5; 206/278
(58) Field of Search ........................... 198/349, 867.06, 198/867.11, 803.14; 209/937, 583, 582, 651, 653, 916; 206/459.5, 278

(56) References Cited

U.S. PATENT DOCUMENTS

| | | | | |
|---|---|---|---|---|
| 1,463,948 A | * | 8/1923 | Geimer ................... 206/278 X |
| 2,717,086 A | * | 9/1955 | Bush ...................... 198/349 X |
| 3,204,759 A | * | 9/1965 | Palmer ................. 206/459.5 X |
| 3,409,129 A | * | 11/1968 | Sperry ..................... 209/653 X |
| 3,872,966 A | * | 3/1975 | Gordon et al. ....... 206/459.5 X |
| 4,832,203 A | * | 5/1989 | Nozawa .................. 198/349 X |
| 5,752,600 A | * | 5/1998 | Kurashina et al. ... 206/459.5 X |
| 5,799,769 A | * | 9/1998 | Heer et al. .................. 198/349 |
| 5,881,886 A | | 3/1999 | Lawandy .................... 209/3.3 |
| 5,964,354 A | * | 10/1999 | Skinner .................. 209/583 X |
| 6,085,914 A | | 7/2000 | Tobaccowala et al. ...... 209/702 |
| 6,176,369 B1 | * | 1/2001 | Petrovic ................ 198/867.11 |

* cited by examiner

*Primary Examiner*—Joseph D. Pape
*Assistant Examiner*—Patricia L. Engle
(74) *Attorney, Agent, or Firm*—Caesar, Rivise, Bernstein, Cohen & Pokotilow, Ltd.

(57) ABSTRACT

A carrier assembly including a carrier container (e.g., a box) and a bag (e.g., a flexible transparent plastic bag) for holding an article, e.g., a garment belt. The garment belt has scanner-readable indicia associated with it (e.g., a bar code is disposed on a hang tag secured to the belt's buckle). The carrier assembly is arranged to be used with other such assemblies, each holding an article (e.g., a garment belt), by an automatic dispensing machine to select the carrier assembly from other similar carrier assemblies and to dispense the selected carrier assembly therefrom based on the scanner readable indicia. The automatic dispensing machine includes a scanner for scanning the scanner-readable indicia. The bag is adapted to hold the garment belt in a compact, e.g., coiled, configuration therein. The bag with the coiled belt therein is located within the interior of the hollow carrier container and is held in place therein (e.g., the carrier container includes a slit for engaging a portion of the bag). The carrier container includes at least one window through which the scanner-readable indicia is visible to be readily scanned by the scanner of the automatic dispensing machine to enable the machine to selectively dispense the carrier assembly therefrom based on the scanner-readable indicia read.

24 Claims, 2 Drawing Sheets

US 6,360,867 B1

BELT CARRIER FOR DISPENSING MACHINES

FIELD OF THE INVENTION

This invention relates generally to product carriers, and more specifically carriers for belts or similar items for use with automated dispensing machines.

BACKGROUND OF THE INVENTION

Garment belts that are sold at retail stores come in various sizes, styles and colors. In the normal course of business, a belt manufacturer has the task of taking orders for the garment belts, manufacturing them, and then shipping the orders to the retailers. The garment belts are typically stored and shipped in sleeves, e.g., elongated cardboard boxes, in which the belts are laid out lengthwise. In order to select the belts that are to be placed in the sleeve for shipment to the customer, the belts of various sizes which the customer has ordered are typically selected and removed manually from bins at the manufacturing facility.

Automatic dispensing means have been used in the past in various applications involving the selection of particular products from a line based on coded information, e.g., a bar code, associated with the product to enable the dispensing machine to dispense selected items for packaging. A limitation of such automated dispensing machines is that their use is typically limited to dispense products which are all the same or a similar size. Since garment belts typically ordered by large merchandisers will be of various sizes, e.g., an order may consists of a number of size 29", 30", 32", 34", 36", 38", 40" and 42", such an order has typically been filled by the manufacturers manually selecting those belts and packing them up for shipment.

Thus, there presently exists a need for some means for holding respective garment belts of different sizes and styles therein and which can be used with automated dispensing machines.

SUMMARY OF THE INVENTION

One aspect of the invention comprises a carrier assembly in the form of the combination of a carrier container and a bag. The bag, e.g., a flexible transparent plastic bag, is arranged for holding a product, e.g., a garment belt, or other item therein. The garment belt has associated with it a machine readable code, e.g., a bar coded label, located on a hang tag on the belt. The bag with the garment belt in it is placed within the interior of the carrier container. The carrier assembly is arranged to be used by an automatic dispensing machine, e.g., an apparatus having a conveyor mechanism, a dispensing unit and a scanner, to enable the machine to select the carrier assembly from other similar carrier assemblies in accordance with certain criteria, e.g., a bar coded tag, and to dispense the carrier assembly therefrom if the carrier assembly is to be selected, e.g., signals received from the scanner's reading of the bar code indicate that the product is to be selected.

The carrier container itself comprises a hollow member, e.g., a parallelopiped shaped box, having an interior space for the bag. The carrier container is sized to hold a garment belt within the bag in a compact, e.g., coiled, configuration. The bag with the belt in it is arranged to be held securely within the interior of the hollow container against accidental displacement. The container has at least one window through which the machine-readable indicia, e.g., a bar code, is visible to be scanned by the scanner to enable the dispensing machine to selectively dispense the carrier assembly therefrom.

DETAILED DESCRIPTION OF THE PREFERRED EMBODIMENT

Figure 1:
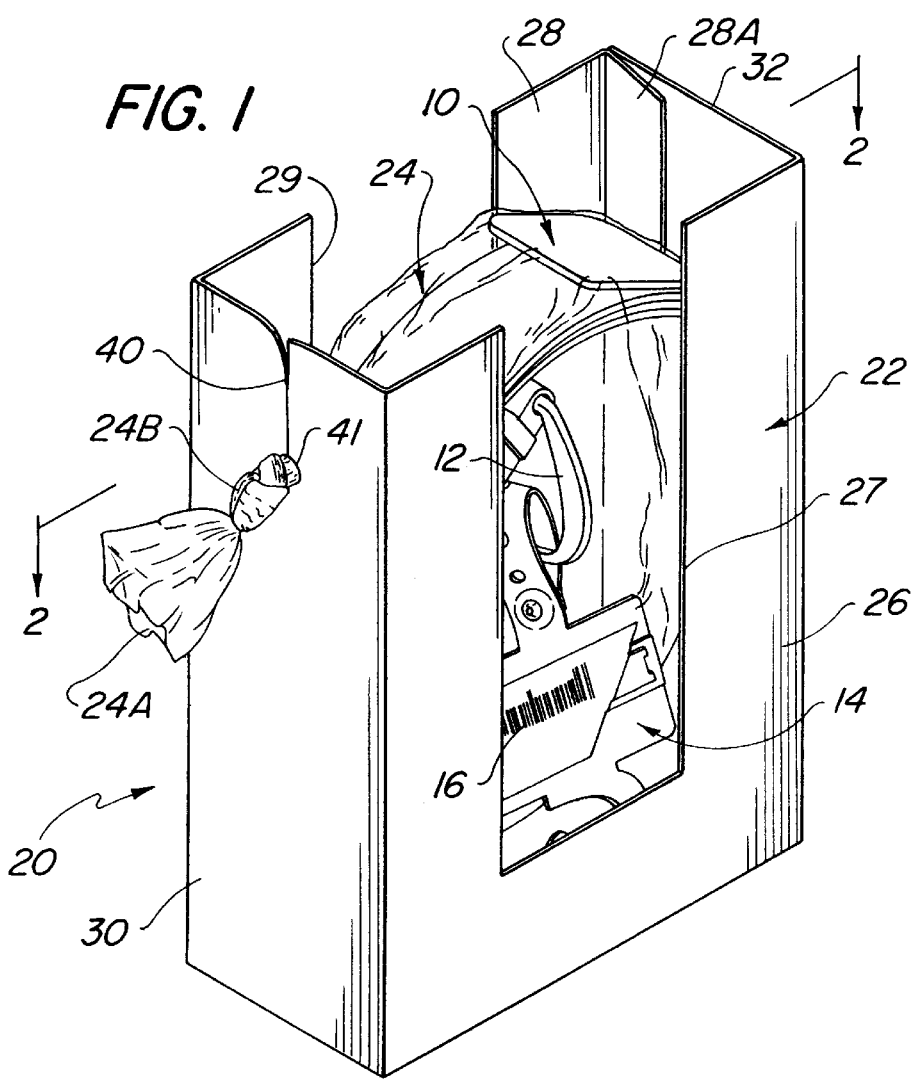
FIG. 1 is an isometric view of one preferred embodiment of a carrier assembly constructed in accordance with the subject invention and shown holding a conventional garment belt having a bar coded tag suspended therefrom and with the belt being shown coiled up.
Figure 3:
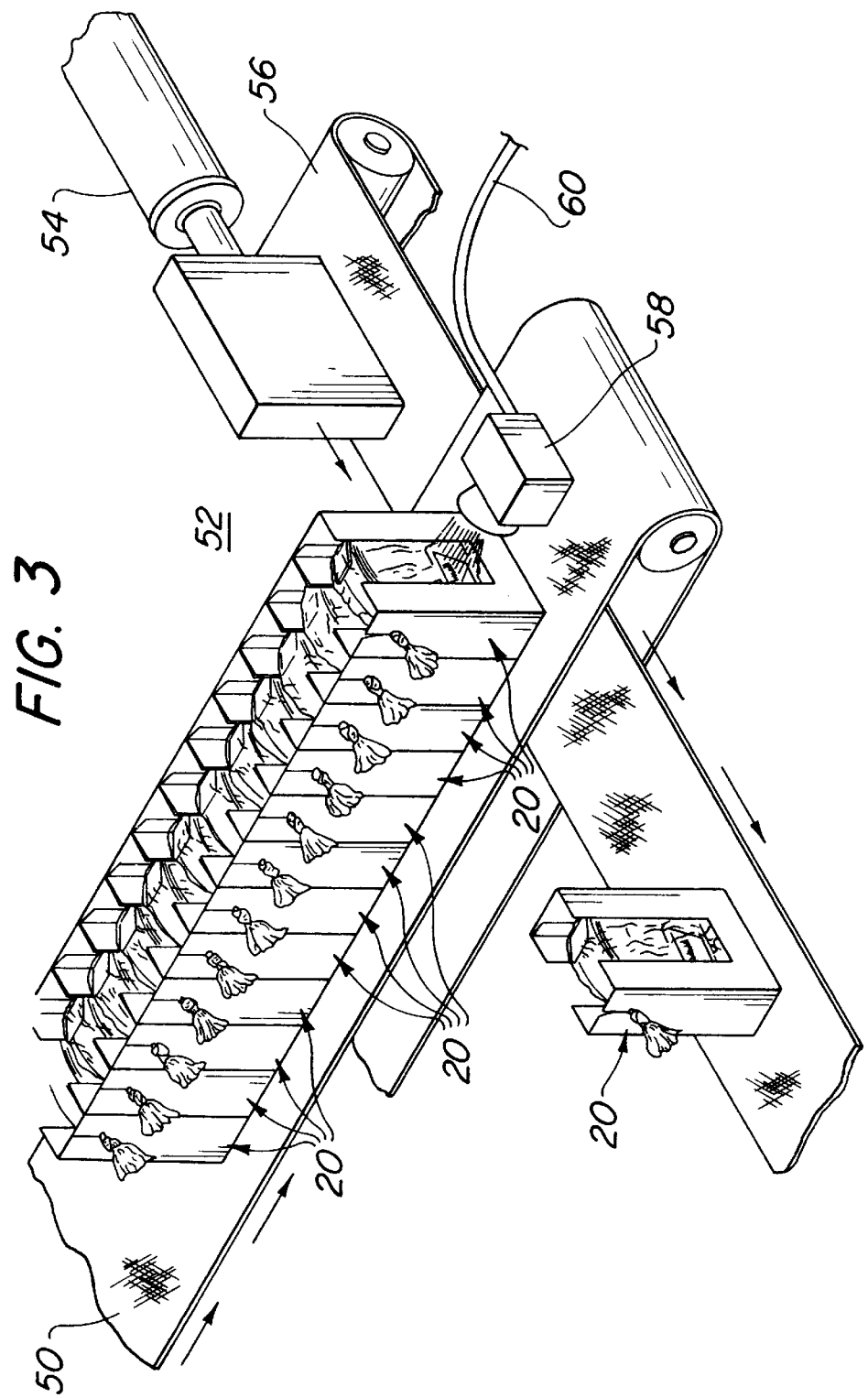
FIG. 3 is an isometric view of one portion of an exemplary conventional dispensing apparatus or machine having at least one conveyor belt, at least one dispensing station (e.g., pusher) and at least one scanner for reading the bar coded tag, with the apparatus being shown during the process of selecting and dispensing selected filled carrier assemblies from a supply or line of such carrier assemblies.

Referring now to the various figures of the drawing wherein like reference numbers refer to like parts, there is shown in FIG. 1 a carrier assembly 20 constructed in accordance with one exemplary embodiment of this invention. The carrier assembly in this embodiment is shown holding an article 10, e.g., a conventional garment belt, therein so that it can used with a conventional, automatic dispensing machine or apparatus 52 (FIG. 3).

It should be pointed out at this juncture, that while the following description will focus on the carrier assembly 20 holding a garment belt 10, it should be clear that the subject invention can be used for holding other types of products of varying sizes which need to be dispensed by automatic dispensing machines. To that end, a plurality of carrier assemblies 20 can be constructed of identical size and shape, but each being arranged to hold a respective product therein, irrespective of the size of the product, so that an automatic dispensing machine can select selected ones of the filled carriers to dispense it (them) from the machine in accordance with bar coded information on the product.

As will be described in detail later, the carrier assembly 20 basically comprises a carrier container 22, e.g., a box-like member, and a bag 24. The bag 24 is a flexible member, e.g., a conventional plastic bag, which is arranged to hold the garment belt in a compact configuration therein. In particular, in the embodiment shown, the garment belt 10 is coiled up so that it takes up less room, and is protected from damage. The bag itself serves to protect the belt from soiling or other damage or injury. The bag 24 may be formed of any suitable material, e.g., polyethylene or other suitable plastic film stock. In accordance with the preferred embodiment of the invention, at least a portion of the material is transparent to enable a bar code (to be described later) associated with the belt 10 to be visible therethrough. As will also be described later, when the belt 10 is within the bag the bar code is oriented to face outward and is located at a position so it will be exposed or visible through a "window" (to be described later) in the carrier container for scanning by a scanner forming a portion of the dispensing machine (also to be described later). If desired, the bag may be opaque, with a transparent area or opening through which the bar code may be seen. If the bag is totally opaque the bar code can be placed on the outside of the bag in a position so that it is visible through a window of the carrier container when the bag is within the carrier container.

In a preferred embodiment of this invention the belt is coiled up within the bag to take up less space. In order to prevent the belt from uncoiling or from otherwise gaining egress from the bag, the top portion 24A of the bag is preferably twisted and knotted at 24B as shown in FIG. 1. The bag with the belt in it is arranged to be releasably secured at a desired orientation within the interior of the carrier container 22 so that the bar code is visible by use of the twisted and knotted end of the bag cooperating with a portion of the carrier container (as will be described later).

As is conventional, garment belts sold at mass merchandising establishments are typically displayed for sale by hanging them from display racks. To that end, it is a common practice for the belt manufacture to releasably secure a conventional hang tag, e.g., a plastic tag, on the buckle of the belt. Since the subject invention is particularly suited for use by belt manufacturers selling to vendors who typically display the belts by hanging them from a display rack, the belt 10 shown in FIG. 1 includes a conventional hang tag 14 releasably secured to a buckle 12 of the belt 10. A bar coded sticker or label 16 forming a portion of this invention and bearing the heretofore mentioned bar code is secured on the hang tag 14 to facilitate the selection and dispensing operation of the apparatus or machine making use of the carrier assembly 20, as will be described later. When located within the bag the hang tag 14 is oriented so that the bar coded label 16 faces outward within the window, like shown in FIG. 1, so it will be within the scanner's field of view.

Figure 2:
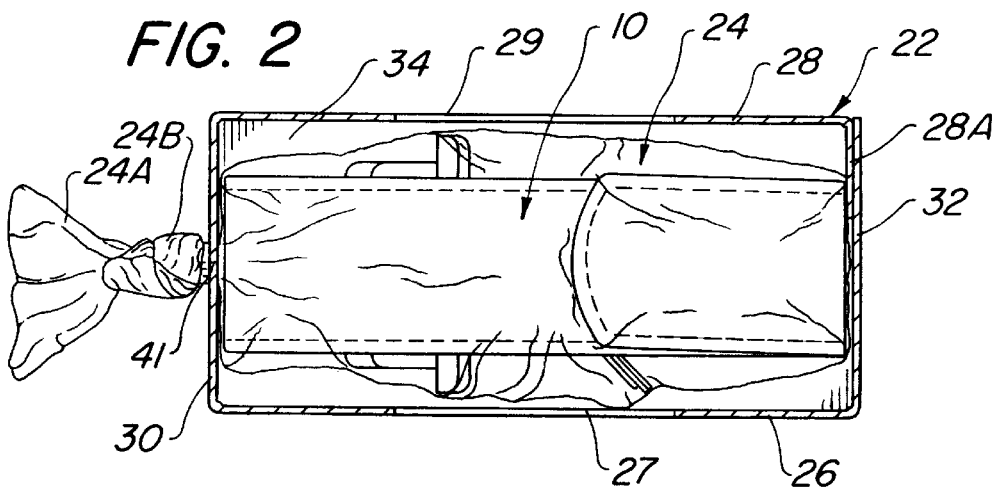
FIG. 2 is a sectional view taken along line 2—2 of FIG. 1.

Referring to FIGS. 1 and 2, it can be seen that the carrier container or box 22 is a generally parallelopiped shaped hollow member having a generally planar, rectangularly shaped front wall 26, an identically shaped rear or back wall 28, a generally planar rectangularly shaped left side wall 30, an identically shaped right side wall 32, and a generally planar bottom wall 34. The carrier container 22 can be constructed of any suitable material, such as cardboard, plastic, metal, etc. In the embodiment shown herein, the container 22 is formed of a blank of cardboard which is die-cut and folded to form the shape shown. The box 22 is seamed along one vertical edge. In particular, a seam formed by a flange 28A extends along the right side edge of the back wall. The flange 28A is adhesively secured to the inner surface of the right side wall 32.

It should be pointed out at this juncture that while the carrier box 22 is shown as being of a parallelopiped shape, other suitable shapes and dimensions for accommodating the bag 24 with the belt 10 (or any other article) therein can be constructed in accordance with teachings of this invention.

The front wall 26 of the carrier box 22 is disposed parallel to the back wall 28 and is spaced therefrom by a distance sufficient to accommodate the width of the coiled belt 10 in the bag when the bag with the belt therein is disposed in the carrier box. The top of the carrier box is open. This feature enables the carrier box to be readily filled, e.g., the bag can be inserted into the interior of the box through the open top.

The left side wall of the box is parallel to the right side wall and is also spaced therefrom by a sufficient distance to accommodate the diameter of the coiled belt in the bag. In accordance with one exemplary embodiment of this invention the width of the carrier box, that is the distance between the two side walls 30 and 32 is approximately 4 inches, the thickness of the carrier box, that is the distance between the front and rear walls 26 and 28, respectively, is approximately 2 inches, and the height of the box, that is the distance from its bottom wall 34 to its open top, is approximately 5.75 inches.

The front wall and the backwall each include identical U-shaped openings that form a front wall window 27 and a back wall window 29, respectively. The front wall window and the back wall window, while shown as being rectangular can be of various sizes or shapes, so long as they allow the bar coded label 16 on the hang tag 14 to be visible therethrough, so that the scanner can scan the bar code to read it.

As should be appreciated to those skilled in the art, both of the walls 26 and 28 of the box need not include a window, e.g., the back wall can be solid, without any window, so long as at least one wall includes a window through which the bar code is visible. However, the use of the two windows, one in the front wall and one in the rear wall enables the carrier assemblies 20 to be oriented in various directions in the dispensing machine for scanning, e.g., the bar coded label can be located so it appears either out of the front window or the rear window, depending upon the path of the carrier assemblies through the dispensing machine and the location and orientation of the dispensing machine's scanner.

Since the carrier box 22 is open at its top end to enable the bag with the coiled belt therein to be placed within its hollow interior, means are provided to hold the bag with the belt in it securely in place so that the bar code is exposed within the desired window and is resistant to displacement, which could obscure the bar code. To that end, in the embodiment shown in FIG. 1 the left side wall 30 of the carrier box 22 includes a slit 40 at its upper end contiguous with the open top. The slit 40 is formed so that its two marginal edges touch. This arrangement is merely exemplary. Thus, the slit 40 can be in the form of a slot, wherein the two marginal edges of the box which form the slot are slightly spaced from each other. In any case, the slit or slot extends vertically down the left side wall 30 and terminates at its lower end in an enlarged opening 41. In the embodiment shown that opening is circular in shape, but can be of any suitable shape, e.g., an oval, square, triangle, etc.

The slit 40 with its open lower end 41 serves to releasably secure the bag holding the belt within the carrier box. To that end, the portion of the bag immediately adjacent the knot 24B is inserted into the slit 40 from the top open end of the box and slid down the slit 40 until it resides within the enlarged opening 41, as shown in FIG. 1. This action effectively locks the bag in place within the hollow interior of the box 22, with the bar code at the desired position and orientation, i.e., facing outward and fully visible through the window. If desired, the top edge of the box contiguous with the slit may be in the form of a V-shaped entryway (not shown) to facilitate the introduction of the bag portion into that slit. In any case, once the bag is locked in place within the carrier box the assembled carrier assembly can then be moved into the production line of the dispensing machine, i.e., the a line of similar filled carrier assemblies like shown in FIG. 3.

Referring now to FIG. 3, there is shown a stack or line of plural carrier assemblies 20 constructed in accordance with this invention, each being filled with a belt 10, and shown disposed on one conveyor belt 50 of an automated dispensing machine 52. The dispensing machine 52 includes a dispensing mechanism comprising a piston-operated pusher 54 disposed adjacent a second conveyor belt 56. A bar code scanner 58 is disposed adjacent the conveyor belt 50 and its angle of view is oriented so that it can scan the bar code on the tag appearing through the exposed window of each carrier assembly 20 as the carrier assembly is carried down the conveyor belt 50. The bar code scanner 58 is located in a position such that it does not interfere with the movement of the line of carrier assemblies 20 down the conveyor belt 50.

Each of the carrier assemblies 20 is oriented in an identical manner to the other carrier assemblies. In particular, the rear wall 28 of one carrier assembly is disposed immediately adjacent the front wall 26 of the next succeeding carrier assembly, and all of the right side walls 30 in which the slit with the extending bag portion is located are oriented in the same direction facing away from the pusher 54.

It should be noted that the dispensing apparatus 52 shown in FIG. 3 is merely a simplified illustration of any suitable type of dispensing apparatus or machine which can be used with the carrier assemblies of this invention. That apparatus includes the scanner 58 and associated electronics (not shown) which is designed to read the bar code with each belt carried in each respective carrier assembly to determine if it is the desired size, style and color and to provide a signal to a controller to cause the machine to dispense the carrier assembly if it meets those criteria to fill a particular order. In particular, the scanner 58 is operative to read the bar code 16 through the window and the transparent bag 24 to provide an electrical signal, via a cable 60, to the controller (not shown) of the dispensing machine 52. If the bar code scanned indicates that the belt 10 is the desired size, color a and style for the order, the dispensing machine's controller causes the pusher mechanism 54 to push the carrier assembly holding that belt off of the conveyor belt 50 and onto the carrier belt 56 for subsequent packing with other selected carrier assemblies to fill the customer's order. If, however, the bar code scanned by the scanner indicates that the belt is not the desired size, color and style, the carrier 20 with the belt therein is carried by the conveyor belt 50 to some other location, e.g., back into inventory for restocking, or to some other area for filling another customer's order.

As should be apparent to those skilled in the art, that since the carrier boxes are of parallelopiped shape, once the carrier assemblies with the desired belt sizes and styles have been selected and dispensed they can be stacked or packed up one against the other in a conventional shipping carton or box for delivery to the customer. In order to insure that the carrier assemblies can be readily packed within conventional cartons or boxes without any wastage of space, the carrier boxes 22 are sized so that the belt coiled therein fits within the interior of the carrier box without bowing the front or rear walls outward. This enables the carrier assemblies to be stacked one against another inside a shipping carton without wasted space.

While the carrier box 22, shown and described heretofore, has an open top, it is clear that, if desired, the top of the carrier box can include a lid or cover which folds down to close the top but, which can be folded up to open the top of the box to allow the coiled belt in the bag to be inserted therein. In such an alternative arrangement it may not be necessary to utilize the slit in the box to hold the bag in position, e.g., the knotted portion of the bag can be extended outside the box through the interface between the lid and the side wall 30 or 32 to hold the bag in place. The use of a slit or some other means to hold the bag in position in the carrier box is desirable, since it insures the bag with the belt therein does not shift within the carrier box to a position wherein the bar code is obscured by any portion of the box surrounding the window, or is in the window, but outside the scanner's field of view.

As should be appreciated from the foregoing, the subject invention provides a very effective and efficient means for holding belts or other articles which can be of different sizes in a standard sized and shaped container for use with automatic dispensing equipment. The container itself is adapted to hold a flexible bag or similar structure in which the product is stored in a compact configuration to facilitate its packing with similar items and to protect the belt from soiling or damage. In order to enable the automatic selection of any particular item, the item includes a machine readable code, e.g., a printed bar code, which is visible through the bag and through an opening or window in the carrier container. If the material making up the carrier container is itself transparent the walls making up the carrier container need not include any window, e.g., the walls themselves will form a "window" through which the bar code or other machine readable code can be read or scanned. Moreover, as discussed above, the entire bag itself need not be transparent so long as it has a transparent portion or opening through which the bar code can be seen. Alternatively, the bar code can be placed on the outer surface of the bag for scanning through the window. Further still, the bar code need not be placed on a hang tag. Thus, the bar code can be placed on the belt itself. It should also be borne in mind that while the description of the invention has focused on bar codes, the subject invention is not so limited. Thus, any machine-readable code can be used.

Without further elaboration the foregoing will so fully illustrate my invention that others may, by applying current or future knowledge, adopt the same for use under various conditions of service.

I claim:

1. A carrier assembly comprising a carrier container and a bag for holding a garment belt therein, the garment belt having scanner-readable indicia associated therewith, said carrier assembly being arranged to be used by an automatic dispensing machine to enable the machine to select said carrier assembly from other similar carrier assemblies and to dispense said selected carrier assembly from the machine, the machine including a scanner for scanning the scanner-readable indicia, said carrier container having an interior space, said bag being adapted to hold the garment belt in a compact configuration therein, said bag with the belt therein being arranged to be located within said interior of said carrier container, said carrier container having a window therein, whereupon the scanner-readable indicia associated with the belt is visible through said window to be readily scanned by the scanner to enable the dispensing machine to selectively dispense said carrier assembly therefrom.

2. The carrier assembly of claim 1 wherein at least a portion of said bag is formed of a transparent material and wherein the scanner-readable indicia is located within said bag and viewable through said transparent material.

3. The carrier assembly of claim 1 wherein said carrier container includes an open end into which said bag with the belt therein can be inserted.

4. The carrier assembly of claim 1 wherein said carrier container includes means for holding the bag in place within said hollow interior.

5. The carrier assembly of claim 4 wherein said holding means comprises a slit in a portion of the carrier container into which a portion of said bag is inserted for engagement.

6. The carrier assembly of claim 5 wherein said bag is flexible and include a knot formed therein.

7. The carrier assembly of claim 6 wherein a portion of said bag adjacent said knot is located within said slit.

8. The carrier assembly of claim 7 wherein said slit includes an enlarged opening into which said portion of said bag adjacent said knot is located to hold said bag in place.

9. The carrier assembly of claim 1 wherein said carrier container is parallelopiped shaped having a front wall, rear wall, an opposed pair of side walls, and a bottom wall.

10. The carrier assembly of claim 9 wherein said carrier container includes an open top into which said bag with the belt therein can be inserted.

11. The carrier assembly of claim 10 wherein at least one of said walls of said carrier container includes said window.

12. The carrier assembly of claim 1 wherein said carrier is formed of cardboard.

13. In combination a carrier assembly, a garment belt, and an automatic dispensing machine, said assembly comprising a carrier container and a bag, said carrier assembly being arranged for holding said bag therein, said garment belt having scanner-readable indicia associated therewith, said carrier assembly being arranged to be used by said automatic dispensing machine to enable said machine to select said carrier assembly from other similar carrier assemblies and to dispense said carrier assembly therefrom, said dispensing machine including a scanner for scanning said scanner-readable indicia, said carrier container comprising a hollow member having an interior space, said bag being adapted to hold said garment belt in a compact configuration therein, said bag with said garment belt therein being arranged to be located within the interior of said carrier container, said carrier container having a window therein, whereupon the scanner-readable indicia associated with said garment belt is visible through said window to be readily scanned by said scanner to enable said dispensing machine to selectively dispense said carrier assembly therefrom.

14. The combination of claim 13 wherein at least a portion of said bag is formed of a transparent material and wherein the scanner-readable indicia is located within said bag and visible through said transparent material.

15. The combination of claim 13 wherein said carrier container includes an open end into which said bag with said garment belt therein can be inserted.

16. The combination of claim 13 wherein said carrier container includes means for holding said bag in place therein.

17. The combination of claim 16 wherein said holding means comprises a slit in a portion of said carrier container into which a portion of said bag is inserted for engagement.

18. The combination of claim 17 wherein said bag is flexible and include a knot formed therein.

19. The combination of claim 18 wherein a portion of said bag adjacent said knot is located within said slit.

20. The combination of claim 19 wherein said slit includes an enlarged opening into which said portion of said bag adjacent said knot is located to hold said bag in place.

21. The combination of claim 15 wherein said carrier container is parallelopiped shaped having a front wall, rear wall, an opposed pair of side walls, and a bottom wall.

22. The combination of claim 21 wherein said carrier container includes an open top into which said bag with the belt therein can be inserted.

23. The combination of claim 22 wherein at least one of said walls of said carrier container includes said window.

24. The combination of claim 11 wherein said carrier is formed of cardboard.

\* \* \* \* \*